(12) United States Patent
Welch

(10) Patent No.: US 6,261,176 B1
(45) Date of Patent: Jul. 17, 2001

(54) ENCLOSED THRESHING CYLINDER WITH RASP-TYPE BARS

(76) Inventor: Terry J. Welch, 714 N. Prairie, St. John, KS (US) 67576

( * ) Notice: Subject to any disclaimer, the term of this patent is extended or adjusted under 35 U.S.C. 154(b) by 0 days.

(21) Appl. No.: 09/237,151

(22) Filed: Jan. 25, 1999

(30) Foreign Application Priority Data

Nov. 24, 1998 (CA) .................................................. 2254451
Nov. 26, 1998 (CA) .................................................. 2254728

(51) Int. Cl.⁷ .................................................. A01F 12/20
(52) U.S. Cl. .................................................. 460/72; 460/110
(58) Field of Search .................................. 460/30, 32, 33, 460/46, 66, 71, 72, 110

(56) References Cited

U.S. PATENT DOCUMENTS

| | | | |
|---|---|---|---|
| 1,853,784 | * 4/1932 | Stevens | 460/71 |
| 2,334,461 | * 11/1943 | Welty | 460/72 |
| 3,092,115 | * 6/1963 | Morgan | 460/71 |
| 3,203,428 | * 8/1965 | Ausherman | 460/71 |
| 3,256,887 | * 6/1966 | Ausherman | 460/71 |
| 3,401,700 | 9/1968 | Karlsson . | |
| 3,512,533 | * 5/1970 | Lowen | 460/71 |
| 3,927,679 | 12/1975 | Ausherman . | |
| 4,505,279 | * 3/1985 | Campbell et al. | 460/66 |
| 4,796,645 | 1/1989 | Kuchar . | |
| 4,909,772 | * 3/1990 | Kuchar | 460/71 |
| 5,083,977 | 1/1992 | Coers . | |
| 5,254,036 | 10/1993 | Johnston et al. . | |
| 5,624,314 | 4/1997 | Welch . | |

FOREIGN PATENT DOCUMENTS

| | | | |
|---|---|---|---|
| 1022681 | * 7/1983 | (SE) | 460/72 |
| 1029888 | * 7/1983 | (SU) | 460/72 |
| 1754000 | * 8/1992 | (SU) | 460/32 |

OTHER PUBLICATIONS

"Sunnybrook High Inertia Rotors...," Semi Annual Buyers Guide for KS/NE Farmers & Breeders, Fall 1994 Edition.

Parts Catalog for Model N5 and Model N6 Allis–Chalmers Combines, Oct. 1982, pp. 194–195.

Parts Catalog for Model M Series Allis–Chalmers Combine, Oct. 1975, pp. 176–177.

* cited by examiner

*Primary Examiner*—Robert E. Pezzuto
*Assistant Examiner*—Árpád Kovćs
(74) *Attorney, Agent, or Firm*—Jeffrey L. Thompson; Thompson & Thompson, P.A.

(57) ABSTRACT

An improved threshing cylinder for a combine has an enclosed cylinder construction and rasp-type cylinder bars secured to mounting flanges on an outer periphery of the enclosed cylinder. The enclosed cylinder is substantially impervious to crop material so that debris cannot accumulate inside the cylinder during operation. The rasp-type cylinder bars are center-arched, deep-toothed, and have leading edges that slope rearwardly relative to a direction of rotation less than about 15 degrees from a radial line passing through the axis of rotation. The teeth on the rasp-type bars have a substantially constant height from a leading edge to a trailing edge of the bars. The mounting flanges each have a sloped front surface for guiding crop material outwardly to the rasp-type bars, and a mounting surface having a plurality of bores for attaching the rasp-type bars. The leading edges of the rasp-type bars are substantially the same as the trailing edges such that an orientation of the bars can be reversed on the threshing cylinder to extend a service life of the bars.

16 Claims, 4 Drawing Sheets

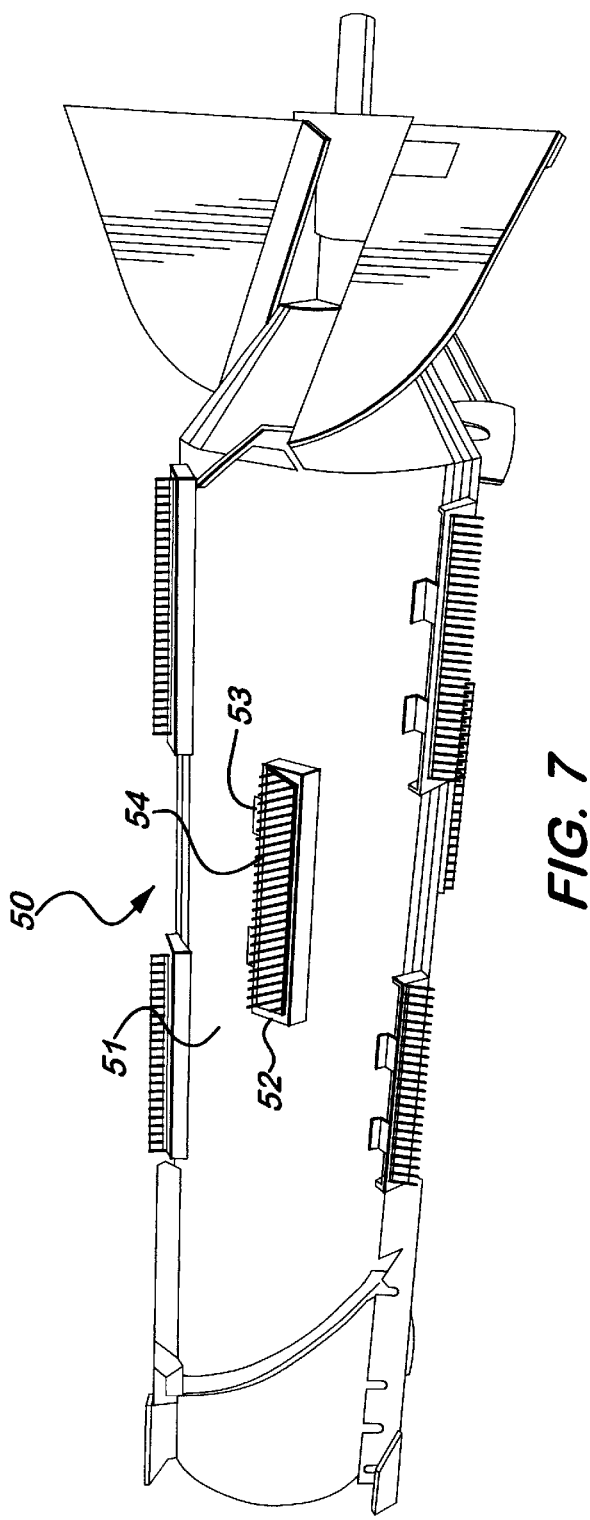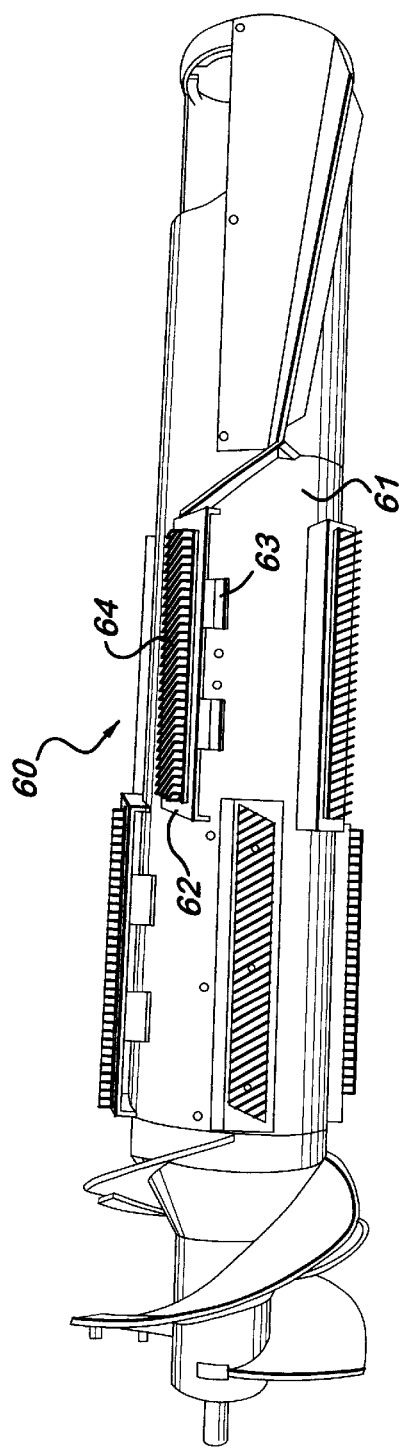

ENCLOSED THRESHING CYLINDER WITH RASP-TYPE BARS

BACKGROUND OF THE INVENTION

1. Field of the Invention

The present invention relates generally to agricultural combines for harvesting crops. In particular, the present invention relates to an improved threshing cylinder with rasp-type bars for separating grain from plant residue in a combine.

2. Description of the Related Art

A combine is an agricultural machine that harvests, threshes, and cleans grain while moving over a field. The combine typically has a complicated threshing system for separating the grain from the crop residue and a series of conveyors for depositing the grain into a holding bin and eventually into a wagon or truck. The crop residue is exhausted from the rear of the combine and deposited in the field being harvested.

Combines typically have a rotating threshing cylinder used in the early stages of grain-crop residue separation. The rotating cylinder operates in cooperation with a concave structure positioned adjacent to and below the cylinder. As the crop moves between the threshing cylinder and the concave, the cylinder-concave combination operates to separate the grain from the husk or leafy portion of the plant. The cylinder includes a plurality of rub-type bars or rasp-type bars spaced around the periphery and extending the length thereof, while the concave includes a plurality of spaced bars generally parallel to the rub-type bars or rasp-type bars. The crop is directed to the space between the rotating cylinder and the concave, and the action of the rotating cylinder upon the crop causes the grain to become separated from the remaining portion of the plant. The grain is then subjected to additional processing for further separation, while the crop residue is discharged from the combine.

Threshing cylinders can be positioned transverse to the direction of movement of the combine over the field as shown, for example, in U.S. Pat. No. 4,796,645. Alternatively, the threshing cylinder can be positioned longitudinally to the direction of flow, in which case the combine is commonly referred to as an axial-flow machine, and the threshing cylinder is referred to as a "rotor." Hybrid machines having both a transverse threshing cylinder and an axial separating unit have also been disclosed as shown, for example, in U.S. Pat. No. 5,083,977. The term "cylinder" as used in the present application is intended to cover all of the cylindrical threshing mechanisms used in these arrangements.

Conventional threshing cylinders have an "open" construction, which is shown, for example, in U.S. Pat. Nos. 3,927,679 and 5,254,036. The open cylinder construction has caused various problems during operation. For example, the impact of the open cylinder structure upon the plant often results in cracking of the grain. In addition, debris such as crop residue and soil ingested by the combine is frequently deposited in and retained by the rotating cylinder. As the mass of this debris increases, out of balance operation of the cylinder occurs resulting in irregular engagement of the crop by the cylinder and degraded grain separation. This out-of-balance condition may require the combine operator to interrupt operation and clean out the debris within the cylinder. This condition also causes increased wear on the cylinder's bearings resulting in reduced combine reliability.

Enclosed threshing cylinders have been developed, in part, to overcome the problems experienced with open cylinder constructions. An enclosed cylinder construction is shown, for example, in U.S. Pat. No. 4,796,645. Enclosed cylinders generally have a solid, continuous cylindrical surface on which cylinder bars are mounted for threshing the grain. Alternatively, the enclosed cylinder structure can have a star or polygonal-shaped cross-section as shown, for example, in the Fall 1994 Edition of the Semi Annual Buyers Guide for KS/NE Farmers & Breeders and marketed under the proprietary name "Sunnybrook High Inertia Rotors." The enclosed cylinders are closed on their ends so that crop material and other debris are kept out of the middle of the cylinder during operation.

Cylinder bars for combines are of three basic types: rasp-type bars, flat rub-type bars, and angled rub-type bars. The terms "rasp-type bar" and "rub-type bar" are terms of art that have a definite meaning to those skilled in the art. However, it is noted that certain patent disclosures in this technology, such as U.S. Pat. No. 4,796,645, have used the term "raspbar" to refer to a structure that those skilled in the art would normally refer to as an angled rub-type bar. The differences between these basic types of cylinder bars will become apparent from the following descriptions thereof.

Flat rub-type bars were used in older combines and had a relatively flat configuration with a relatively wide spacing and a short, curved tooth configuration. The flat rub-type bars had a fairly thin base and, consequently, had very little strength for holding threshing cylinder elements in their proper places. The flat rub-type bars required backing plates for mounting, which were permanently affixed to the cylinder elements, usually with rivets, in order to maintain permanent alignment of those parts, and to avoid bending of cylinder bars. Backing plates, however, were built in a low, narrow profile, which in conjunction with shorter teeth on the cylinder bar required a relatively fast cylinder speed to feed the machine. Also, the short profile tended to scoop material into the cylinder, causing balance problems.

Angled rub-type bars, which are widely used today have a shape that is much more rigid than the conventional flat rub-type bars, and can be mounted directly to the cylinder components without a backing plate for reinforcement. Angled rub-type bars, such as those shown in U.S. Pat. No. 4,796,645, are bent at an angle of approximately 45 degrees between a shallow-toothed portion and a flat leading face. The flat leading face is approximately 1 ¼ inch wide and has mounting holes formed therein for securing the rub-type bars to mounting structures on the cylinder. The angled rub-type bars are mounted on the cylinder with a forward pitch of approximately 15 degrees to allow maximum exposure to the most efficient feeding area of the tooth curvature. Since a maximum height of the teeth is approximately only 5/16 inch when they are new, the flat leading face assists in feeding material through the machine. Moreover, the wider leading profile, as opposed to an original flat rub-type bar and backing plate combination, helps to prevent material from entering the interior of the cylinder.

Angled rub-type bars operate in the following manner. The front face, at an approximately 55-degree angle to the concave crossbars, gathers material and pulls it across the concave for threshing. This leading angle gives material a rolling action, and forces the smaller portions to a pinch point between the top radius of the cylinder bar teeth and the concave crossbars. At this point, the material is spread into a thinner layer than was originally carried into the machine. The teeth on the outer surface of the cylinder bar are provided to comb through and move this thinned layer, and also to provide an escape channel for grain that would otherwise be broken or crushed. Although initial impact of the cylinder bar face will cause some threshing, virtually all of the threshing and separating functions are provided by the resistance of the concave crossbars to the material being forced over them. It is therefore critical that as much material as possible be moved to the outer periphery of the cylinder, and that the teeth be maintained as near to full height and original curvature as practicable.

Several problems have been observed with angled rub-type bars, including overthreshing, poor separation, cracking, underthreshing, inconsistent cylinder speed, and bending and twisting under load. The overthreshing occurs because the material is separated in a thin layer, and larger components of the crop are forced to the concave crossbars where they are torn up and forced to the cleaning shoe. Also, in order to spread the material as it enters the threshing area, a relatively fast cylinder speed is required.

Poor separation of the angled rub-type bars occurs because some grain is not carried to the outer periphery of the cylinder and rests against the cylinder bar face or remains mixed with dunnage. This grain must be separated in the secondary separation area. Cracking occurs because the dunnage is torn into relatively small pieces by the angled rub-type bars and falls through the chaffer more easily and requires closing down the cleaning sieve. This causes more grain to be returned to the cylinder area, where it is dropped onto the concave without benefit of the padding effect of the husks, straw, and so forth.

Underthreshing of the angled rub-type bars occurs in larger grains, where the size or amount of material entering does not allow the load to be thinned adequately for separation by the cylinder bar teeth against the concave crossbars without grinding. Inconsistent cylinder speed occurs in weedy situations or vine crops because the smooth front face of the angled rub-type bar occasionally fails to pull material from the feeder house chain. This material tends to pile in front of the concave, eventually moving through in a large mass, causing an extra load for the cylinder drive components. Occasionally, this mass will lodge and cause complete stoppage of the cylinder. The bending and twisting under load occur in conventional machines that use cylinder spiders that float on the center shaft of the cylinder. This arrangement eases alignment for purpose of installation, but also allows the bars to flex and sometimes remain in a bent or twisted shape if the machine is slugged. If the angled rub-type bars are heat treated, they also occasionally break due to metal fatigue caused by this flexing.

In contrast to the flat and angled rub-type bars, rasp-type bars use a tall, aggressive tooth configuration, with a relatively close spacing between the teeth. The rasp-type bars use a tooth configuration which is approximately twice as tall as the teeth on an angled cylinder bar. The leading side of these teeth is at an angle of about 75 to 80 degrees relative to a tangential line on the path of rotation (i.e., about 10 to 15 degrees relative to a radial line passing through the center of rotation). The rasp-type bars typically have a spacing between the teeth of approximately ¼ inch with an arch in the top center of the tooth that approximately conforms to the concave bore. The base of the rasp-type bars is fairly thick and heavy, and usually conforms to a cylinder spider that has a circular mounting rim. The rasp-type bars are typically built heavy enough to be mounted independently, and strong enough to hold floating cylinder heads (i.e., spiders) in proper alignment when bolted directly to them. As compared to the flat and angled rub-type bars, the rasp-type bars have several advantages, which will be described below in conjunction with the present invention. However, prior to the Applicant's invention, rasp-type bars were not used in conjunction with an enclosed cylinder structure.

SUMMARY OF THE INVENTION

It is an object of the present invention to provide an improved threshing cylinder that has the advantages of both an enclosed cylinder structure and rasp-type bars to achieve superior threshing results, operating reliability, grain separating capacity, and fuel efficiency in a combine.

It is a further object of the present invention to provide an improved threshing cylinder arrangement with an enclosed structure and rasp-type bars that can be retrofit to existing combines.

According to the present invention, an improved threshing cylinder for a combine is provided that has an enclosed cylinder construction and rasp-type cylinder bars secured to mounting flanges on an outer periphery of the enclosed cylinder. The enclosed cylinder is constructed such that it is substantially impervious to crop material such that debris cannot accumulate inside the cylinder during operation. The rasp-type cylinder bars have leading edges that slope rearwardly relative to a direction of rotation less than about 15 degrees from a radial line passing through the axis of rotation. The teeth on the rasp-type bars have a substantially constant height, preferably greater than one-half inch, from a leading edge to a trailing edge of the bars. The teeth also have an arch formed at a center portion such that the outer peripheries of the teeth conform generally to a path of rotation of the teeth. The mounting flanges each have a sloped front surface for guiding crop material outwardly to the rasp-type bars, and a mounting surface having a plurality of bores for attaching the rasp-type bars. The leading edges of the rasp-type bars are substantially the same as the trailing edges so that the orientation of the bars can be reversed on the threshing cylinder to extend a service life of the bars.

According to another broad aspect of the present invention, a threshing mechanism for a combine is provided, comprising: an enclosed structure having a longitudinal axis of rotation, and an outer periphery and closed ends that define a closed space surrounding the longitudinal axis of rotation, the closed space being substantially impervious to crop material; a plurality of mounting structures secured to the outer periphery of the enclosed structure at circumferentially spaced positions, the mounting structures each having a mounting face positioned radially outwardly from the outer periphery; and a plurality of rasp-type bars secured to the mounting faces and extending along a length of the enclosed structure.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 7 is a perspective view of an axial-flow cylinder for use in a combine in accordance with a second embodiment of the present invention.

FIG. 8 is a perspective view of an axial-flow cylinder for use in a combine according to a third embodiment of the present invention.

DETAILED DESCRIPTION OF THE PREFERRED EMBODIMENTS

An enclosed threshing cylinder with rasp-type bars according to preferred embodiments of the present invention will now be described with reference to FIGS. 1 to 8 of the accompanying drawings.

Figure 1:
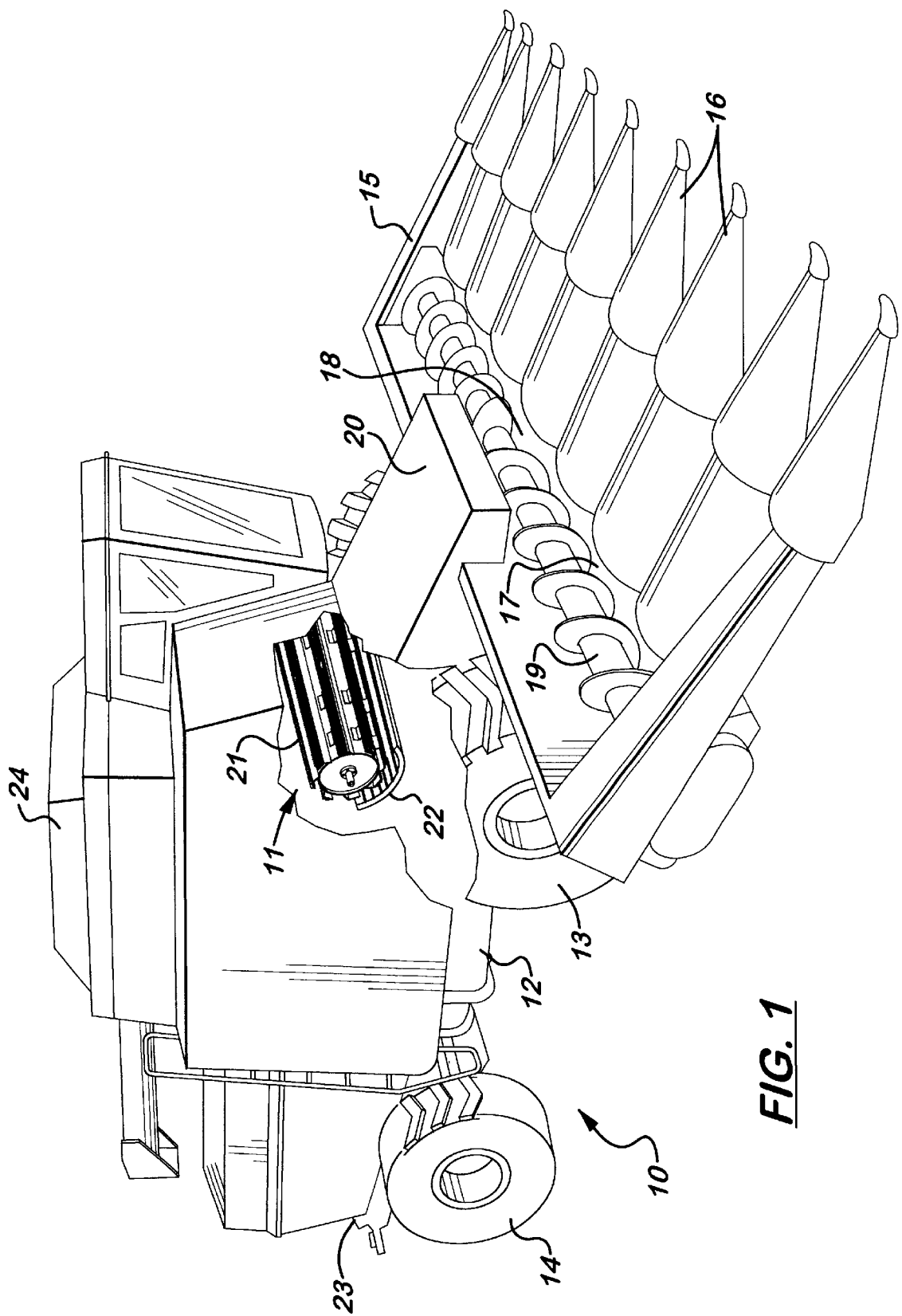
FIG. 1 is a partially cutaway perspective view of a combine equipped with the improved threshing cylinder of the present invention.
Figure 2:
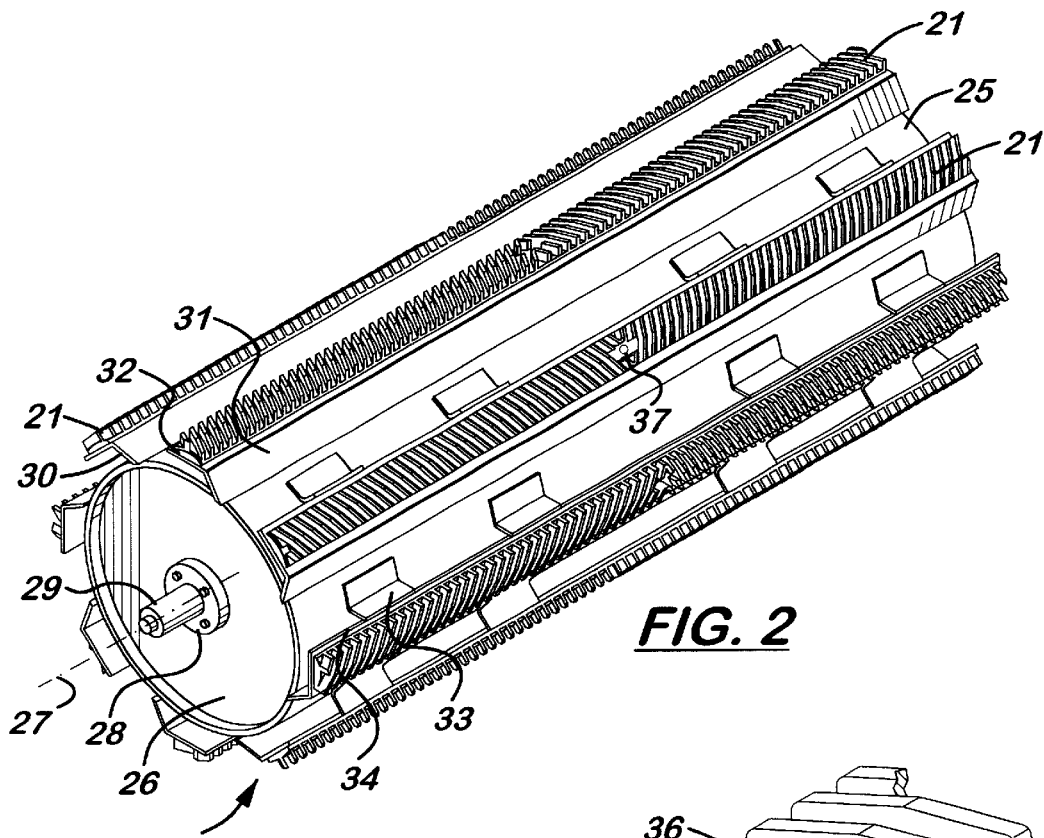
FIG. 2 is a perspective view of a threshing cylinder for use in a combine in accordance with the present invention.

FIG. 1 provides a partially cutaway perspective view of a self-propelled combine 10 incorporating an enclosed threshing cylinder 11 with rasp-type bars according to the present invention. The combine 10 has a supporting structure 12 with front and rear ground engaging wheels 13, 14. The ground engaging wheels 13, 14 are driven by a propulsion means (not shown) for moving the combine 10 across a field. The forward part of the combine 10 is provided with a header assembly 15 having a plurality of head units 16 spaced across a width thereof. The header assembly 15 can be provided with various types of row crop head units 16 for harvesting corn, soybeans or milo, or can be in the form of a cutting platform for harvesting wheat and the like. The head units 16 are adapted to separate and remove portions of the plant, such as the ears of corn, from the remaining plant stalk. The removed portions of the plant, which contain both grain and plant residue, are then delivered to a rear portion 17 of the header assembly and are directed to the center 18 thereof by an auger 19 having left and right-handed helical auger flighting. From the center, rear portion 18 of the header assembly 15, the grain and crop residue mixture is delivered to a feeder house 20 that transports the mixture to a threshing and separating mechanism. The threshing mechanism includes the enclosed threshing cylinder 11 of the present invention.

The threshing cylinder 11 includes a plurality of spaced rasp-type bars 21 extending along the length and spaced around the periphery thereof. A stationary concave structure 22 is positioned adjacent to and below the cylinder 11. Rotation of the cylinder 11 causes the rasp-type bars 21 to operate in cooperation with the concave structure 22 to engage the crop material and separate the grain from the residue of the plant. A secondary threshing and separating arrangement, not shown in FIG. 1, is positioned behind the threshing cylinder 11 for completing the separation process. The chaff and other crop residue removed from the grain is discharged from the rear end 23 of the combine 10, and the clean grain is conveyed into a storage bin 24 on the combine 10.

The details of the enclosed threshing cylinder 11 with rasp-type bars 21 according to a first embodiment of the present invention will now be described with reference to FIGS. 2 to 6.

The threshing cylinder 11 includes a cylindrical outer surface 25 with first and second ends that are closed by respective end plates 26. The cylindrical outer surface 25 and end plates 26 together define a closed space surrounding the longitudinal axis of rotation 27, which space is substantially impervious to crop material and other debris. The end plates 26 are secured to respective hub assemblies 28, which are mounted on a center shaft 29. The center shaft 29 passes through the length of the cylinder 11 and extends from both ends of the cylinder 11. A pulley or sprocket (not shown) is attached to one end of the center shaft 29 for receiving a driving force from an endless belt or chain (not shown) for rotatably driving the cylinder 11 during operation of the combine 10.

A plurality of generally L-shaped mounting flanges 30 are secured to the outer surface 25 of the cylinder 11 in spaced relation around the circumference of the cylinder 11 and extend along substantially the entire length of the cylinder 11. The mounting flanges 30 each have a front face 31 tapered rearwardly and outwardly relative to a direction of rotation, and a flat mounting face 32. In cross section, the flat mounting face 32 lies generally perpendicular to a line passing through the axis of rotation 27 of the cylinder 11. A plurality of support pieces 33 are secured between the outer surface 25 of the cylinder 11 and a trailing side 34 of the mounting flange 30. The mounting flanges 30 and support pieces 33 are preferably secured to the cylinder 11 by welding, although other suitable fastening means, such as threaded bolts or screws, could also be used.

The front face 31 of each of the mounting flanges 30 forms an angle a of approximately 40 to 50 degrees relative to a radial line R passing through the axis of rotation 27. The slope of the front face 31 facilitates movement of the crop material outwardly to a point where the threshing action occurs between the teeth of the rasp-type bar 21 and the concave structure 22.

The flat mounting face 32 of each mounting flange 30 has a plurality of bores 35 extending therethrough. A plurality of rasp-type bars 21 are positioned on the flat mounting faces 32 of the mounting flanges 30. The rasp-type bars 21 have bores 36 extending therethrough that correspond and align with the bores 35 extending through the mounting flange 30. A plurality of mounting bolts 37 extend through the bores 35, 36 in the rasp-type bars 21 and the mounting flange 30 to secure the rasp-type bars 21 to the cylinder 11.

Figure 3:
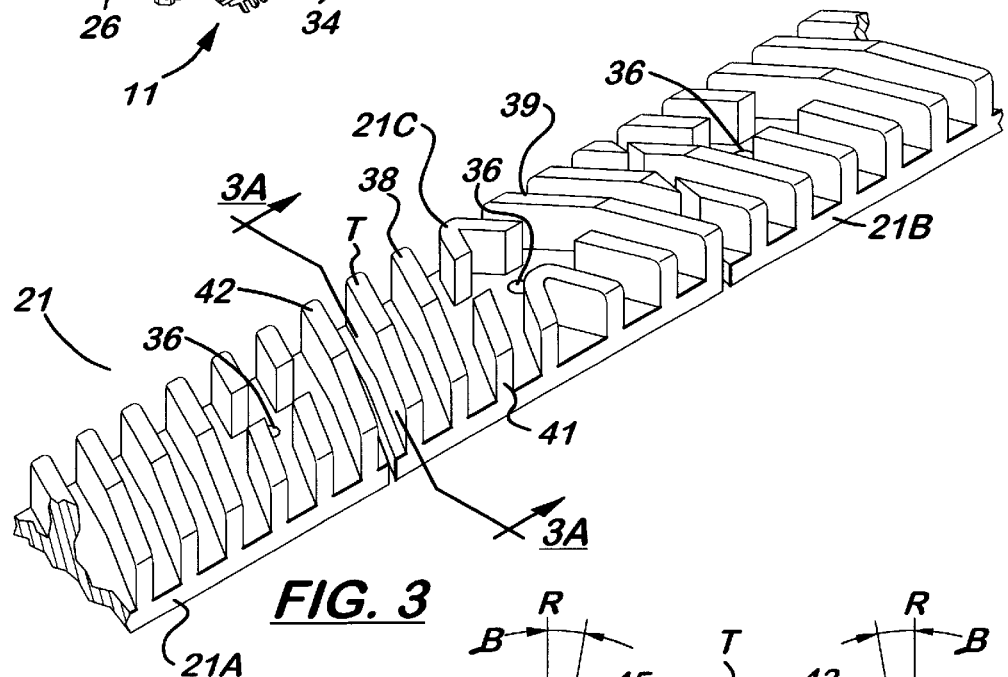
FIG. 3 is a perspective view of a rasp-type bar assembly used with the threshing cylinder of the present invention.

In a preferred arrangement, the rasp-type bars 21 are provided in sections so that a forward-angled outer section 21a, a reverse-angled outer section 21b, and a center section 21c are secured to each mounting flange 30. As explained in the Applicant's earlier U.S. Pat. No. 5,624,314, this arrangement of sections eliminates the need for a large inventory of various lengths of rasp-type bars 21 for each type and size of machine. The outer sections 21a, 21b can be made one length, and the center section 21c can be made in several lengths to accommodate different cylinder lengths and configurations. The center section 21c preferably has both forward-angled teeth 38 and reverse-angled teeth 39 and, in the case of a short cylinder length, can be secured using a single mounting bolt through a center bore 40, as shown in FIG. 3. The adjacent ends of the outer and center sections 21a, 21b, 21c are angled to fit together snugly, thereby allowing the center section 21c to be secured using a single mounting bolt. Positioning plates (not shown) can be secured to the mounting flange 30 to abut against the leading and/or trailing edges of the center section 21c to help stabilize the center section 21c against rotation.

Figure 3A:
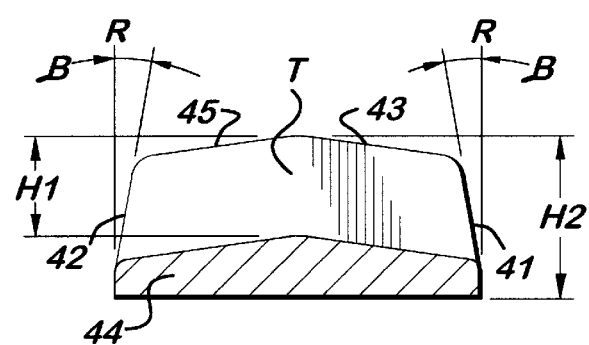
FIG. 3A is a sectional view of the rasp-type bar assembly as viewed along line 3A—3A in FIG. 3.
Figure 4:
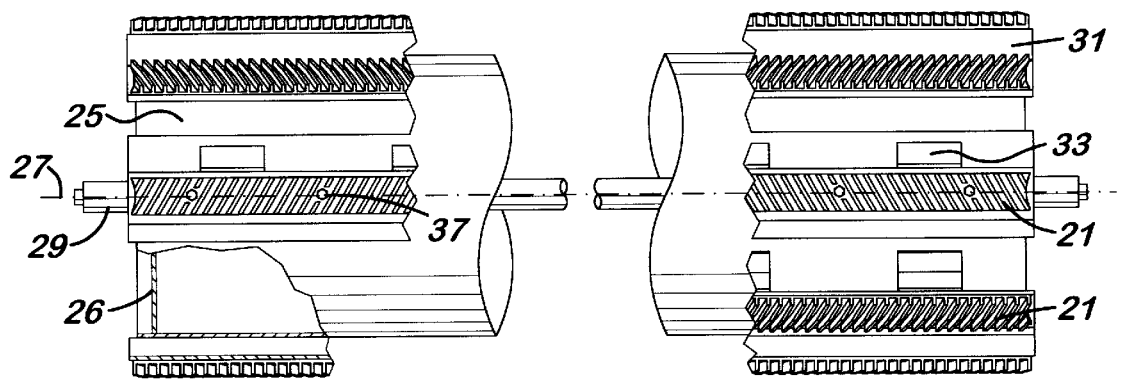
FIG. 4 is a partially cutaway planar view of the improved threshing cylinder according to the present invention.
Figure 5:
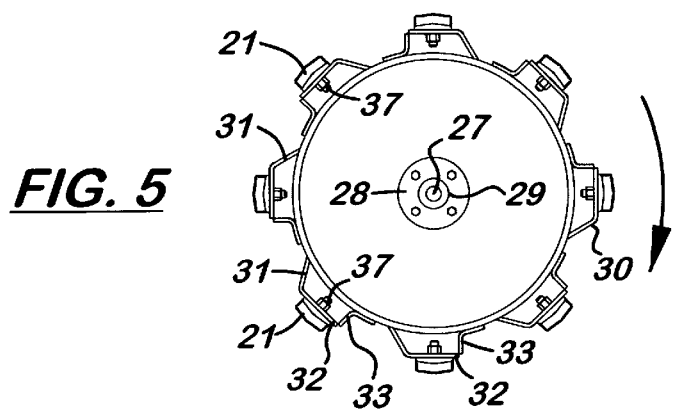
FIG. 5 is an end view of the threshing cylinder illustrated in FIG. 4 taken along the longitudinal axis of the cylinder.

The tooth configuration of the rasp-type bars 21 of the Applicant's invention is shown in detail in FIGS. 3 and 3A.

The teeth T of the rasp-type bars 21 are approximately twice as tall and positioned closer together as compared to the teeth on the conventional flat and angled rub-type bars described above. As shown in FIG. 3A, the leading side 41 of the teeth T is sloped only slightly rearwardly to extend at an angle β, in cross section, of less than approximately 15 degrees, and preferably about 10 degrees, relative to a radial line R passing through the axis of rotation 27 of the cylinder 11. The same slope angle β is preferably provided on the trailing side 42 of the teeth 1 so that the rasp-type bars 21 can be reversed on the mounting flanges 30 to compensate for wear. Thus, the leading and trailing edges 41, 42 are oriented such that they converge toward each other in a radially outward direction.

The teeth T of the rasp-type bars 21 have an arch 43 in their top center that approximately conforms to the curvature of the concave structure 22 (i.e., the arch 43 conforms generally to the path of rotation of the cylinder 11). The height H. of each tooth T from its base 44 to its top 45 is approximately constant from the leading edge 41 to the trailing edge 42, including at the center of the arch 43. In practice, the tooth height H. on the rasp-type bars 21 is greater than one-half inch, and preferably about 5/8 inch, over the entire length of the tooth T. In contrast, the tooth height at the highest point on a rub-type bar is approximately only 5/16 inch (when new) and tapers to a very shallow height on the leading side. The base 44 of the rasp-type bars 21 are relatively thick and heavy as compared to the flat and angled rub-type bars described above.

Figure 6:
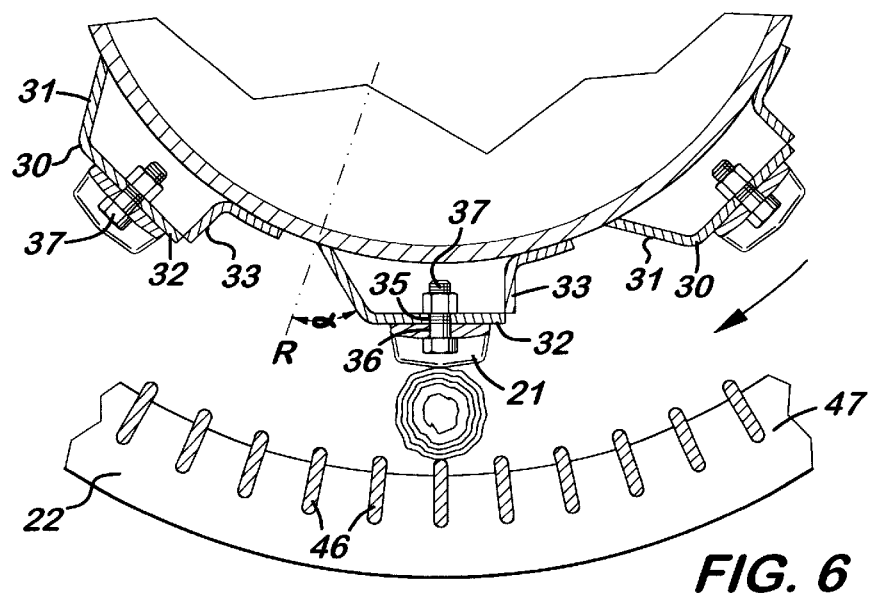
FIG. 6 is a sectional view of the threshing cylinder shown in FIG. 5 showing additional details thereof and the manner in which the cylinder cooperates with the concave in the grain separation process.

As shown in FIG. 6, the rasp-type bars 21 work in conjunction with the crossbars 46 on the concave structure 22 to thresh grain from a crop material. The crossbars 46 are coupled to and extend between a plurality of curved brackets 47 in a known manner. The rotating cylinder 11 and the concave structure 22 are preferably positioned off-center relative to each other so that as each rasp-type bar 21 passes over the concave structure 22, the rasp-type bar 21 moves closer to the concave structure 22. Thus, displacement between each rasp-type bar 21 and the concave structure 22 becomes progressively smaller as the rasp-type bar 21 is displaced over the concave structure 22. This configuration tends to reduce impact damage to the grain.

The combination of an enclosed cylinder structure 11 and rasp-type cylinder bars 21 according to the present invention provides significant advantages over the prior art threshing cylinder arrangements.

The combined height $H_2$ of the mounting base 44 and teeth T of the rasp-type bars 21 (approximately 2½ inches) provides sufficient clearance between the concave structure 22 and the outer periphery of the cylindrical surface 25 to minimize carryover. This height $H_2$ and clearance allow the teeth T to do a larger percentage of the separating. The outer periphery of the cylindrical surface 25 holds material against the surface of the concave crossbars 46, but has adequate depth for larger crop components, such as ears of corn, to be fed through without crushing. The sloped leading face 31 of the mounting flange 30 feeds material to the tooth area of the rasp-type bars 21 to facilitate threshing and separating by the teeth T of the rasp-type bars 21. The rasp-type bars 21 also improve the threshing operation of the enclosed cylinder 11 by allowing more room for tumbling of larger crops, such as ears of corn.

The straighter angle β of the leading tooth face 41 on the rasp-type bars 21 pulls the crop material more easily, and also imparts a more active tumbling action to the material as it is fed through. In contrast, the flatter angle of the rub-type bars has a greater tendency to hold the material against the concave.

The distance from the leading corner of the rasp-type bars 21 to the tallest portion of the teeth T (i.e., the center arch 43) is much greater than that of angled rub-type cylinder bars. This gives greater exposure of thinned material at the cylinder periphery to the crossbars 46 of the concave 22.

Since the leading and trailing faces 41, 42 of the rasp-type bars 21 are identical, these cylinder bars 21 can be reversed to extend their service life when wear has occurred on the leading corners of the teeth T. This is not the case with the angled rub-type bars of the prior art, which have only one possible orientation, and consequently, a shorter service life.

The castings for the rasp-type bars 21 are substantially heavier in weight, in relation to length, than rub-type bars. In conjunction with the enclosed cylinder structure, which has most of its turning weight near the outer periphery of the cylinder, the threshing cylinder 11 of the present invention has a substantially higher rotational inertia than the prior art threshing cylinders. This higher inertia helps the cylinder 11 carry material, such as vine crops and weeds, through the threshing mechanism more easily with less fluctuation in its speed of rotation.

Additional threshing cylinder embodiments 50, 60 of the present invention are shown in FIGS. 7 and 8. The embodiment 50 shown in FIG. 7 is a modified axial-flow rotor for a late model Case-IH combine, while the embodiment 60 shown in FIG. 8 is a modified axial-flow rotor for a late model New Holland combine. In each of these embodiments, an existing enclosed cylinder (rotor) 51, 61 was modified to include mounting flanges 52, 62 and rear supports 53, 63 to secure rasp-type bars 54, 64 to the outer surface of the enclosed cylinder 51, 61. The mounting flanges 52, 62 and rear supports 53, 63 are similar to those described above with reference to the embodiment shown in FIGS. 2 to 6. The rasp type bars 54, 64 are circumferentially spaced about the enclosed cylinders 51 61 in a configuration that facilitates axial movement of the crop material along the length of the cylinder 51, 61 during operation. Advantages similar to those described above for the embodiment of FIGS. 2 to 6 are achieved by modifying these enclosed cylinders 51, 61 to include rasp-type bars 54, 64 according to the present invention. These advantages were not achieved in the prior art because these existing enclosed cylinders 51, 61 were originally equipped with angled rub-type bars.

With the rasp-type bars of the present invention, varous lengths of bars, different tooth configurations, and unique mounting configurations can be used by the simple creation of a different mold for the rasp-type bars. This is much less expensive than creating die sets for new extrusion dies, which are required to make these same changes to rub-type bars. Also, the number of components in inventories can be decreased due to the varying combinations of center and outer rasp-type bars, as taught in the Applicant's prior U.S. Pat. No. 5,624,314.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A threshing mechanism for a combine, comprising:
    an enclosed cylinder having a longitudinal axis of rotation, and a cylindrical outer periphery and closed ends that define a closed space surrounding the longitudinal axis of rotation, the closed space being substantially impervious to crop material;
    a plurality of mounting structures secured to said cylindrical outer periphery of the enclosed cylinder at circumferentially spaced positions, said mounting structures each having a mounting face positioned radially outwardly from said outer periphery;

a plurality of rasp-type bars secured to said mounting faces and extending along a length of said enclosed cylinder;

said rasp-type bars each comprises a base portion and a plurality of teeth evenly spaced along a length of said base portion and extending therefrom, said teeth having leading edges that are sloped rearwardly and radially outwardly relative to a direction of rotation at an angle of less than 15 degrees from a radial line passing through said axis of rotation;

said teeth each have a height from said base portion to a tip of said teeth that is substantially constant from leading edges of the teeth to trailing edges thereof; and said mounting structures each have a sloped front surface that slopes outwardly and rearwardly relative to a direction of rotation to guide crop material toward said rasp-type bars.

2. The threshing mechanism according to claim 1, wherein said angle is about 10 degrees.

3. The threshing mechanism according to claim 1, wherein said teeth have trailing edges oriented at approximately the same angle as said leading edges such that the leading and trailing edges converge toward each other in a radially outward direction.

4. The threshing mechanism according to claim 1, wherein said rasp-type bars are removable from said mounting faces, and wherein leading edges of the rasp-type bars are substantially the same as trailing edges thereof such that an orientation of the bars can be reversed to extend a service life of the bars.

5. The threshing mechanism according to claim 1, wherein said height of said teeth is greater that one-half inch.

6. The threshing mechanism according to claim 1, wherein said mounting structures are secured to said outer periphery of said enclosed structure by welding.

7. The threshing mechanism according to claim 1, wherein said mounting structure are each arranged with an open space between a rear side of said mounting face and said outer periphery of said enclosed cylinder, said open space allowing access to an underside of said mounting structures without penetrating the closed space of said enclosed cylinder.

8. The threshing mechanism according to claim 1, wherein said enclosed cylinder comprises a one-piece cylinder member that defines said closed space, the outer periphery of said enclosed cylinder being an outer surface of said cylindrical member.

9. A threshing mechanism for a combine, comprising:

an enclosed cylinder having a longitudinal axis of rotation, and a convex outer surface and closed ends that define a closed space surrounding the longitudinal axis of rotation, the closed space being substantially impervious to crop material;

a plurality of mounting structures secured to said outer surface of the enclosed cylinder at circumferentially spaced positions, said mounting structures each having a mounting face positioned radially outwardly from said outer surface; and a plurality of rasp-type bars secured to said mounting faces and extending along a length of said enclosed cylinder;

said rasp-type bars have a base portion and a plurality of teeth evenly spaced along a length of said base portion and extending therefrom, said teeth each having a height from said base portion to a tip of said teeth that is substantially constant from a leading edge of the teeth to a trailing edge thereof;

said teeth are arched between said leading and trailing edges such that outer peripheries of said teeth conform generally to a path of rotation of the threshing mechanism;

said leading edges of said teeth are sloped rearwardly and radially outwardly relative to a direction of rotation at an angle of less than 15 degrees from a radial line passing through said axis of rotation; and said mounting structures each have a sloped front surface that slopes outwardly and rearwardly relative to a direction of rotation to guide crop material toward said rasp-type bars.

10. An improved threshing cylinder for a combine, comprising:

an enclosed cylinder having a longitudinal axis of rotation, and an outer cylindrical periphery and closed ends that define a closed space surrounding the longitudinal axis of rotation, the closed space being substantially impervious to crop material;

a plurality of mounting flanges secured to said outer periphery of the enclosed structure at circumferentially spaced positions, said mounting flanges each having a sloped front surface that slopes outwardly and rearwardly relative to a direction of rotation, and a mounting surface having a plurality of bores extending therethrough at spaced locations along a length of said mounting surface; and a plurality of rasp-type bars having bores extending therethrough at spaced locations along a length of said rasp-type bars, said rasp-type bars being secured to said mounting surfaces with bolts extending through corresponding bores in said mounting surfaces and said rasp-type bars, said rasp-type bars each comprising a plurality of teeth having leading edges that are sloped rearwardly and radially outwardly relative to a direction of rotation at an angle of less than 15 degrees from a radial line passing through said axis of rotation, and said teeth each having a height which is substantially constant from a leading edge of the teeth to a trailing edge thereof.

11. The threshing cylinder according to claim 10, wherein said angle is about 10 degrees.

12. The threshing cylinder according to claim 10, wherein the trailing edges of said teeth are oriented at approximately the same angle as said leading edges such that the leading and trailing edges converge toward each other in a radially outward direction.

13. The threshing cylinder according to claim 10, wherein said rasp-type bars are removable from said mounting surfaces, and wherein said leading edges of the rasp-type bars are substantially the same as the trailing edges thereof such that an orientation of the bars can be reversed on the threshing cylinder to extend a service life of the bars.

14. The threshing cylinder according to claim 10, wherein said teeth are arched between said leading and trailing edges such that outer peripheries of said teeth conform generally to a path of rotation of the threshing cylinder.

15. The threshing cylinder according to claim 10, wherein said height of said teeth is greater than one-half inch.

16. The threshing cylinder according to claim 10, wherein said mounting flanges are each arranged with an open space between a rear side of said mounting surface and said cylindrical outer periphery of said enclosed cylinder, said open space allowing access to an underside of said mounting flanges without penetrating the closed space of said enclosed cylinder.

* * * * *